R. G. GRODE.
CHAIN CLASP.
APPLICATION FILED SEPT. 23, 1920.
1,375,090.
Patented Apr. 19, 1921.
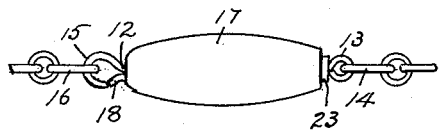
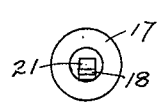 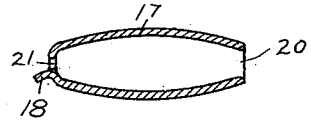
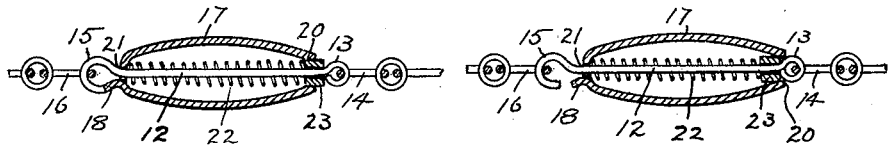
 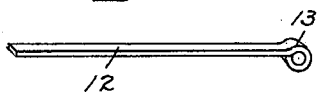
INVENTOR.
R. G. Grode
by Wright Brown Quinby May
ATTYS

UNITED STATES PATENT OFFICE.

RUDOLF G. GRODE, OF NORWOOD, RHODE ISLAND.

CHAIN-CLASP.

1,375,090. Specification of Letters Patent. Patented Apr. 19, 1921.

Application filed September 23, 1920. Serial No. 412,276.

*To all whom it may concern:*

Be it known that I, RUDOLF G. GRODE, a citizen of the United States, residing at Norwood, in the county of Kent, and State of Rhode Island, have invented new and useful Improvements in Chain-Clasps, of which the following is a specification.

This invention has for its object to provide a safety clasp adapted to connect two terminal links of an ornamental chain, in such manner as to prevent accidental disconnection of said links except by breakage, the chief object being to provide an ornamental safety clasp suitable for use as a member of an article of jewelry such as a neck chain.

The invention is embodied in the improvements which I will now proceed to describe and claim.

Of the accompanying drawings forming a part of this specification,—

Figure 1 is a side view of a clasp embodying the invention.

Fig. 2 is an end view of the part called the slide.

Fig. 3 is a section on line 3—3 of Fig. 2.

Fig. 4 is a longitudinal section showing the clasp closed.

Fig. 5 is a view similar to Fig. 4 showing the clasp opened.

Fig. 6 is a perspective view showing the part called the coupling member partially completed.

Fig. 7 is a perspective view of the part called the abutment collar.

The drawings show a neck chain clasp considerably enlarged.

The same reference characters indicate the same parts in each of the figures.

In the drawings 12 represents an elongated coupling member adapted for use in a clasp for neck chains, and composed of a length of wire bent at one end to form a loop or eye 13 adapted to engage a link 14 constituting one terminal link of a chain.

The opposite end of the member 12 is bent to form an open hook 15, adapted to detachably engage a link 16 constituting the other terminal of the chain.

17 represents a slide having a keeper 18 formed to close the hook 15 as shown by Figs. 1 and 4, the keeper being preferably a tongue integral with the slide.

The slide is engaged with the coupling member to move longitudinally thereon, the engaging means being provided by eyes 20 and 21 surrounding the coupling member and formed by contracting the ends of a tube which constitutes the slide. A movement of the slide and keeper in one direction closes the hook 15, and a movement in the opposite direction opens the hook.

I provide means for normally holding the slide with the keeper in hook-closing position, said means being embodied in a helical spring 22 surrounding the coupling member 12 and seated at one end on a contracted portion of the slide 17 adjacent to the eye 21, and at the opposite end on an abutment secured to the coupling member, said abutment being preferably a loose collar 23 applied to the coupling member and held by the spring against the eye 13.

The eye 20 is formed to receive the abutment collar 23 as shown by Fig. 4, and the arrangement is such that when the hook 15 is closed the collar is within the eye 20, and when the hook is opened the eye is moved outward from the collar as shown by Fig. 5.

I also provide means for preventing the slide from turning on the coupling member, and thereby maintaining the keeper in alinement with the hook. To this end I make the coupling member of flat-sided wire as shown by Fig. 6, and form the eye 21 with flat sides as shown by Fig. 2. The flat sides of the coupling member and of the eye 21 contact with each other and prevent the slide from turning on the coupling member.

The slide 17 formed as a tube with contracted ends, conceals the major part of the coupling member and the spring, and is adapted to constitute an ornamental part of a neck chain, the form of the slide being such that it may be readily grasped by a thumb and finger and moved from the position shown by Fig. 4 to that shown by Fig. 5, to open the hook 15. When the slide is released the spring returns it to hook-closing position.

The parts may be conveniently assembled after the coupling member is bent to form the eye 13, as shown by Fig. 6, by successively placing the collar 23 and the spring 22 on the coupling member, then inserting the coupling member in the slide until the hook-forming end of the coupling member projects from the eye 21, and finally bending the projecting end to form the hook 15. The parts are now practically inseparable.

The slide may be provided with the flat-sided orifice 21 and the keeper 22, by first forming the slide with a closed end, and then punching said end in such manner as to displace enough of its material to form the opening and the keeper, the latter being integral with the slide and in close proximity to the opening. As shown by Figs. 1, 2, 3, 4 and 5, the keeper is offset inwardly from the perimeter of the slide, so that it is adapted to coöperate with a hook 15, the diameter of which is less than that of the slide. The keeper and hook, therefore, collectively constitute a member closely resembling in size and general appearance one of the chain links. This simulation of a chain link is especially desirable in a clasp for use in an ornamental chain.

I claim:

A chain clasp comprising an elongated flat-sided coupling member bent at one end to form a closed eye adapted to permanently engage one of two chain links to be connected, and bent at its opposite end to form an open hook adapted to separably engage the other of said links; an abutment collar confined on the coupling member by said eye; a tubular slide having at one end a circular orifice formed to permit said collar to slide therein, and at its opposite end a contracted portion forming a spring seat, a flat-sided orifice in said contracted portion, and a keeper at one side of, and in close proximity to, said orifice, and offset inwardly from the perimeter of the slide, the flat sides of the coupling member and of the orifice preventing rotation of the slide on the coupling member, and maintaining the hook in alinement with the keeper; and a spring within the slide, bearing at one end on said contracted portion, and at the opposite end on said collar to normally maintain the keeper in engagement with the hook, the form and arrangement of the keeper being such that the keeper is adapted to coöperate with a hook, the diameter of which is less than that of the slide, such hook and the keeper constituting a member approximating the chain links in size and form.

In testimony whereof I have affixed my signature.

RUDOLF G. GRODE.